United States Patent
Schilles (10) Patent No.: US 8,007,270 B2
(45) Date of Patent: Aug. 30, 2011

(54) PRESS MOLDING TOOL AND METHOD FOR PRODUCTION OF A COMPONENT BY PRESS MOLDING

(75) Inventor: Wilfried Schilles, Sontra (DE)

(73) Assignee: Faurecia Innenraum Systeme GmbH, Hagenbach (DE)

( * ) Notice: Subject to any disclaimer, the term of this patent is extended or adjusted under 35 U.S.C. 154(b) by 72 days.

(21) Appl. No.: 11/663,070

(22) PCT Filed: Aug. 31, 2005

(86) PCT No.: PCT/DE2005/001525
§ 371 (c)(1),
(2), (4) Date: Oct. 31, 2008

(87) PCT Pub. No.: WO2006/029590
PCT Pub. Date: Mar. 23, 2006

(65) Prior Publication Data
US 2009/0065966 A1    Mar. 12, 2009

(30) Foreign Application Priority Data

Sep. 18, 2004  (DE) .......................... 10 2004 045 398
Sep. 18, 2004  (DE) .......................... 10 2004 045 399
Sep. 18, 2004  (DE) .......................... 10 2004 045 400

(51) Int. Cl.
*B28B 3/00* (2006.01)

(52) U.S. Cl. ........ 425/517; 425/304; 425/235; 425/510; 425/520

(58) Field of Classification Search ............... 425/304, 425/510, 235, 517, 520
See application file for complete search history.

(56) References Cited

U.S. PATENT DOCUMENTS

| | | | | |
|---|---|---|---|---|
| 4,242,074 A | * | 12/1980 | Lake | 425/292 |
| 4,252,518 A | | 2/1981 | Kiefer | |
| 4,328,067 A | | 5/1982 | Cesano | |
| 5,759,594 A | * | 6/1998 | Masui et al. | 425/510 |
| 6,136,415 A | | 10/2000 | Spengler et al. | |
| 6,328,549 B1 | * | 12/2001 | Valyi et al. | 425/112 |
| 2002/0162213 A1 | * | 11/2002 | Saelen et al. | 29/566.1 |

FOREIGN PATENT DOCUMENTS

| | | |
|---|---|---|
| DE | 29 25 500 | 1/1980 |
| DE | 79 06 115 U | 8/1980 |
| DE | 30 30 537 A1 | 3/1982 |
| DE | 33 38 513 A1 | 5/1985 |

(Continued)

*Primary Examiner* — Yogendra Gupta
*Assistant Examiner* — Alison Hindenlang
(74) *Attorney, Agent, or Firm* — Crowell & Moring LLP (57) ABSTRACT

The invention relates to a press moulding tool for the production of a component from at least one first material layer (1) and a second material layer (2) with a moulding tool, determining the shape of the component for production with two tool pieces (11, 12), to carry out the forming of the first material layer (1) and the second material layer (2) and the connection together of both material layers by the bringing together of the first and the second tool piece and with a clamping frame device which comprises a first (21), a second (22) and a third (23) clamping frame element, a cutting device (100), arranged on the third clamping frame element for cutting a projection of the second layer extending between the first and the second tool piece and a method for production of a component.

16 Claims, 5 Drawing Sheets

FOREIGN PATENT DOCUMENTS

| | | |
|---|---|---|
| DE | 43 05 189 A1 | 8/1994 |
| DE | 44 19 908 A1 | 12/1995 |
| DE | 196 29 196 A1 | 1/1998 |
| GB | 1 440 935 A | 6/1976 |
| GB | 1 505 255 A | 3/1978 |
| JP | 51 102059 A | 9/1976 |

* cited by examiner

PRESS MOLDING TOOL AND METHOD FOR PRODUCTION OF A COMPONENT BY PRESS MOLDING

The invention relates to a press molding tool and to a method for production of a component by press molding.

One of the two material layers can be, in particular, a support layer and the other of the two material layers can be, in particular, a decoration layer.

For production of components of this type, it is known from the prior art to use an upper tool and a lower tool in order to mold a support layer and a decoration layer into a predetermined component shape by pressing them together and in order to connect them to each other. During the molding of the material layers into a component shape with a three-dimensional curvature or contour, there is the problem that the materials tend to crease when the upper tool and the lower tool are moved together. These creases are then permanently pressed into the materials and result in the component produced not being able to be used. For this reason, use is made of a clamping frame with which the decorative material or the mat is clamped and is held in a predetermined manner in order to prevent creases from forming on the component in the region between the lower tool and the upper tool.

In the case of the apparatuses of the type in question and in the case of single-stage production processes of this type, the support layer in the form of a heated mat and the decoration layer are placed onto each other before they are shaped by lower tool and upper tool or are pressed against each other by an optionally used clamping frame. There is the further problem, in the apparatuses of the prior art, that the material layers to be molded and to be connected to one another may become stuck to one another in some sections, as a result of which the material layers are then partially connected to one another. During subsequent trimming of the decoration layer and support layer, in which an excess length of the decoration layer is to be achieved, it is no longer possible to separate the material layers in some sections, and therefore the component is not usable for subsequent bending of the decoration layer. A complicated finishing operation is possibly required in order to make the component suitable for the intended use envisaged and in particular to make it suitable for bending.

It is the object of the invention to provide a method and an apparatus with which suitable trimming of the material layers placed into the production apparatus is achieved.

This object is achieved by the features of the independent claims. Further embodiments according to the invention are described in the subclaims which refer back to said independent patent claims.

According to the invention, a press molding tool is provided for production of a component from at least one first material layer and one second material layer with at least one first tool part and one second tool part each having a three-dimensional molding contour, wherein, when the first material layer and the second material layer are placed into the apparatus, the molding contour of the first tool part faces the first material layer and the molding contour of the second tool part faces the second material layer, wherein the tool parts are clamped in a pressure transducer in order to bring about the molding of the first material layer and of the second material layer and the connection of the two material layers to each other by moving the first and the second tool parts together, and with a clamping frame device in order to hold the material layers in their closed position outside the contour region of the tool during the molding operation. The clamping frame device comprises a first clamping frame element which is movable relative to the first tool part by means of a first adjusting device, a second clamping frame element which is movable relative to the second tool part by means of a second adjusting device, and a third clamping frame element which is movable relative to the first or second tool part by means of a third adjusting device and is arranged between the first and the second clamping frame elements. The press molding tool has at least one cutting device 100, 200, 300 with a cutting element 130, 230, 330 which, as seen in its opening and closing direction, runs in a segmental manner on the circumference of the tool parts 11, 12 or completely encircles the latter, for cutting off an excess length of at least one of the material layers, which excess length is present next to the two tool parts 11, 12 during the press molding and is movable relative to at least one of the tool parts.

The cutting device can be arranged, in particular, on the third clamping frame element.

One embodiment of the cutting element of the cutting device arranged on the third clamping frame element can be an edge of the clamping frame element, and the third clamping frame element is movable relative to the first or second tool part into the closed position of said edge in such a manner that the edge interacts with a corresponding bearing region of the first or second tool part in order to be able to sever an excess length of the first or second material layer. Alternatively or in addition, a cutting device can be arranged on the third clamping frame element and has a blade which is movable on the third clamping frame element and transversely with respect to the opening and closing movement of the tool parts by means of an adjusting device in order to be able to sever an excess length of the first or second material layer. Given an appropriate configuration of the cutting device, the cutting element of the cutting device arranged on the third clamping frame element is able to be positioned in such a manner that, when the tools are moved together, the continued flowing of the material layers placed into the clamping frames is not obstructed.

Alternatively or in addition to the cutting device arranged on the third clamping frame element, a cutting device with a cutting element can be arranged on the first and/or second clamping frame element. The cutting element can be, in particular, a blade which is arranged on said clamping frame element by means of an adjusting device and is movable at an angle to or in the direction of the opening and closing movement of the tool parts. The cutting device can be designed in such a manner that, in the closed position of the clamping frame elements, the blade can be positioned in such a manner that, in its initial position, it does not touch the material layers placed into the clamping frame. In this case, in its cutting position, the blade can at least partially protrude through the first or second clamping frame element.

Generally, the cutting element of the cutting device is able to be heated by means of a heating device. The heating device of the cutting element can have a receptacle for at least one heating cartridge which can be inserted therein or can have electric resistance heating.

In general, the movability of the blade can be brought about by an electric, hydraulic or pneumatic drive or by a manual actuating device.

At least one of the two clamping frames can be assigned a device for controlling the temperature of the clamping frame.

According to the invention, a method is also provided for production of a component by press molding of a first and of a second material layer, during which the two layers are connected within the molding contours of two tool parts by moving the latter together, the first and the second tool parts having been moved apart in an initial position, with the following steps:

(a) moving a first clamping frame element and a second clamping frame element into an extended position with respect to each other and placing the first material layer between the two tool parts and between the first and a third clamping frame element, which is arranged between the first and the second clamping frame elements, and placing the second material layer between the two tool parts and between the second clamping frame element and the third clamping frame element, with the first, second and the third clamping frame elements being arranged outside the molding contour of the tool parts, (b) moving the first clamping frame element, second clamping frame element and the third clamping frame element into a position in which the first material layer and the second material layer are held by the first clamping frame element and the third clamping frame element and, respectively, by the second clamping frame element and the third clamping frame element, (c) moving the tool parts together relative to each other with molding of the first and of the second material layers in the region of the molding contours of the tool parts, (d) using a cutting device to cut off an excess length of at least one of the material layers, which excess length protrudes between the first tool part and the second tool part, (e) moving the tool parts and the clamping frame elements apart in order to be able to remove the interconnected first and second material layers from the tool.

The third clamping frame element can be moved into a lower position such that a cutting edge, which is arranged on the third clamping frame element, moves past the first or second clamping frame element at a short distance at a counter position, during which the excess length of the material layer respectively bearing against said element is cut off. In this case, the third clamping frame element can be positioned in such a manner that, when the tools are moved together, the continued flowing of the material layers placed into the clamping frame is not obstructed.

A movable blade arranged on the third clamping frame element can be moved toward the excess length of the particular material layer, which excess length emerges between the first and the second tool part, until said blade severs the material layer. In this case, a cutting element of a cutting device arranged on the first and/or second clamping frame element can be positioned, in the closed position of the clamping frame elements, in such a manner that, in its initial position, said cutting element does not touch the material layers placed into the clamping frame.

The invention is described below with reference to the attached drawings, in which.

The press molding tool according to the invention and the method for production of a component by press molding relate to the production of a component from at least one first material layer 1 and at least one second material layer 2. The layers can be, for example, a decoration layer and a support layer. With the tool and the method, molding of the first layer and of the second layer and the connection of the two layers to each other take place by moving together a first tool part, which faces the first material layer, and a second tool part, which faces the second material layer, of the press molding tool. In general, both layers can be multi-layered, with it also being possible for a plurality of layers of the first layer or of the second layer to be molded and connected to one another by the method and the apparatus according to the invention. In the description below, a single- or multi-layered material layer, which is intended for bearing against the contour-shaping region of the first tool part, is referred to as the first material layer. Analogously, a single- or multi-layered material layer, which is intended for bearing against the contour-shaping region of the second tool part, is referred to below as the second material layer. In general, the first and the second material layers are layers which can be connected to one another under pressure, for example can be fused or interlocked at least in some regions.

One of the two material layers in the component to be produced is preferably a decoration layer and the other of the two layers is a support layer. Embodiments of the invention are described below, in which the first material layer is a decoration layer and the second material layer is a support layer. However, it is also possible that, conversely, the first material layer is a support layer and the second material layer is a decoration layer. Also, one of the two layers does not have to be a decoration layer or support layer. For example, the first and the second layers can be two support layers or two intermediate layers or one support layer and a reinforcing layer, such as, for example, a layer made of glass cloth.

In the case of production of the component with a support layer and a decoration layer, the mutually facing sides of the decoration layer and of the support layer have to be connectable to each other by pressure exerted by the tool and, if appropriate, with the use of heat. For this purpose, that material layer of the decoration layer which faces the support layer can have the property of connecting mechanically to the support layer under pressure, for example by mechanical interlocking of threads or hairs provided on the mentioned side of the decoration layer with the possibly fused-on surface of the support layer. For this purpose, at least the surface of the decoration layer, which surface faces the support layer, can be formed from a woven cloth which can be, for example, a fleece, a felt, a flat cloth, or a circular knit. The decoration layer can also be connected to the support layer by fusing the mutually facing surfaces with the use of pressure by the tool and, if appropriate, with the use of heat. Fusing is achieved if the decoration layer contains foam constituents which belong to the same family of materials as the support layer provided for the fusion.

As the decoration layer, use can be made here of a textile cloth, an expanded leather cloth, a plastics sheet or a leather. If a textile cloth is used as the decoration layer, a layer of textile materials or sheets or a combination of the alternatives mentioned can be used for the starting material. In the case of the component to be produced, a decoration layer can also be provided in order to optimize the haptic properties of the end product on the corresponding side of the component. For this purpose, the decoration layer can also have foam constituents. For example, the decoration layer can be a composite of textile materials, a foam and a fleece material. The foam used can be a PP foam or PE foam or a foam built up on PU.

As the support layer, in particular a plastic and especially a polypropylene (PP)-bound fiber mat is provided. Said support layer can be in particular plasticized by the supply of heat. The support layer is preferably formed from a fiber material, preferably of natural fibers or glass fibers and of plastic fibers and, in particular, polypropylene (PP) fibers. The natural fibers can be formed from flax or kenaf, sisal, linen or cotton. In this case, said fibers are shaped to form a mat in a preparatory step or a step preceding the method. Subsequently, an interconnected plastic mat material is formed as a first or second layer with fusion of the plastic components under application of pressure and temperature.

The invention is described below with reference to an embodiment of a press molding material with a cutting device and with reference to a method for production of a component by press molding and with a cutting operation in which the cutting apparatus according to the invention can be used.

The press molding material according to the invention for production of a component from at least one first material layer 1, a decoration layer in the embodiment described, and one second material layer 2, a support layer in the embodiment described, is a molding tool 10 which determines the contour of the component to be produced from the material layers and has at least one first tool part 11, which faces the first layer and has a three-dimensional molding contour 13, and one second tool part 12, which faces the second layer and has a three-dimensional molding contour 14. The tool parts 11, 12 are moved toward each other by a pressure transducer (not illustrated) in order to bring about the molding of the first material layer 1, or the decoration layer, and of the second material layer 2, or the support layer, and the connection of the two material layers 1, 2 to each other by moving the first and the second tool parts 11 and 12 together. The first tool part 11 can be fitted to a first tool holder or an installation plate 15 and a second tool part 12 can be fitted to a second tool holder or an installation plate 16.

The press molding tool according to the invention furthermore has a clamping frame device 20 with clamping frame elements which are movable with respect to one another and in relation to the tool parts 11, 12, in order to hold the material layers 1, 2 in a predetermined manner outside the contour region of the tool during the molding operation. Said clamping frame device comprises a first clamping frame element 21 which is movable relative to the first tool part 11 by means of a first adjusting device 31, a second clamping frame element 22 which is movable relative to the second tool part 12 by means of a second adjusting device 32, and a third clamping frame element 23 which is movable relative to the first and/or second tool part 11 by means of a third adjusting device 33. The movability of the clamping frames 31, 32, 33 refers at least to the movability in the direction of the opening and closing movement of the tool parts 11, 12. The third clamping frame element 23 is arranged between the first and the second clamping frame elements 21 and 22 and is movable therebetween. The clamping frame elements 21, 22 and 23 are guided in their direction of movement via the adjusting devices 31, 32, 33 and/or via separate guides.

The first, second and third adjusting devices 31, 32 and 33 are devices which are activated by a control device for automatic control, or, if appropriate, additionally via an actuating device for manual or semi-automatic control, of the production process in order to move the respective clamping frame elements 21, 22, 23. The first and the third adjusting devices 31 and 33 are preferably coupled mechanically to the first tool part 11 by, for example, said adjusting devices 31 and 33 and also the first tool part 11 being arranged on a first tool holder or a first installation plate 15. However, the first and the third adjusting devices 31 and 33 can also be fitted on another support or two different supports (not shown) such that, in this case, their extension position is independent of the position of the first tool part 11. The second adjusting device 32 is preferably coupled mechanically to the second tool part 12, for example by being fitted on a second tool holder or a second installation plate 16. However, the second adjusting device 32 can also be arranged on a support (not shown) which is independent of the position of the second tool part 12 such that, in this case, its extension position is independent of the position of the second tool part 12.

The third clamping frame element 33 is arranged, as seen in the relative direction of displacement of the tool parts 11, 12, between the first and the second clamping frame elements 31 and 32 in such a manner that the first and second material layers can be placed, at least in some sections, between the mutually facing contours of the respective clamping frame elements, which contours are provided for the bearing of the first and second material layers. It is preferably provided that, in the production process, the third clamping frame element 33 is moved between the positions of the first and the second clamping frame elements.

The clamping frame elements are each arranged outside the contour-shaping regions of the tool parts 11, 12. Said clamping frame elements can be formed as a single piece and designed as a structure which encircles the tool parts 11, 12. The clamping frame elements can also be formed in a number of parts along the circumference or along a region of the circumference of the tool parts 11, 12. A clamping frame element can also be formed from two parts which are arranged at locations outside the tool parts 11, 12. These locations can be situated in particular diametrically opposite each other. It is also possible for a plurality of parts, for example three or four parts, of a clamping frame element to be arranged outside the circumference of the particular tool part 11 or 12 or of the tool parts 11, 12 in a regular or irregular distribution about the latter, depending in each case on the application.

The clamping frame elements can be formed differently. The construction and arrangement of the clamping frame elements depends on the type, material and design of the component to be produced and on the type, material and design of the materials.

The clamping frame elements 31, 32, 33 each have a bearing region or two bearing regions which is or are provided during the production of the component for the purpose of an excess length region of the first and/or second material layer being able to be placed against it and/or them. The first clamping frame element 21 and the second clamping frame element 22 each have a bearing region while the third clamping frame element 23 has two bearing regions. The bearing region 21a of the first clamping frame element 21 faces a first bearing region 23a of the third clamping frame element 23. These bearing regions 21a and 23a are each designed in such a manner that a holding of an excess length region of the material layers 1 and 2, provided for holding purposes, can be achieved after the clamping frame elements 21 and 23 are correspondingly moved together. The holding can comprise clamping or retention, in particular with the possibility of the material layers 1, 2 continuing to flow, or a combination of these functions. The same applies to a further or second bearing region 23b provided on the third clamping frame element 23 and to a bearing region 22a, which faces said bearing region 23b, of the second clamping frame element 22: these bearing regions 23b and 22a are each designed in such a manner that a holding of an excess length region of the material layers 2 and 1, respectively, provided for holding purposes, can be achieved after the clamping frame elements 23 and 22 have been correspondingly moved together.

According to the invention, the third clamping frame element 23 is provided in order to keep the excess length regions, which are located outside the molding contours 13, 14 of the tool parts 11 and 12, of the two material layers 1, 2, which are retained by the respective clamping frame elements, separate from each other during the closing movement of the tool parts 11, 12 and the molding of the material layers 1, 2 by these tool parts 11, 12. This in particular avoids the material layers 1, 2 sticking outside the molding contours 13, 14. In this manner, continued flowing of the layers, in particular even to a differing extent from each other, is made possible. In addition, machining of the material layers and, in particular, trimming of the outer regions of the material layers can take place subsequently independently of each other. Depending on the application, it can be provided, in particular by means of a special coating, that a bearing region or a plurality of bearing regions inhibits or inhibit the continued flowing of one or both of the material layers 1, 2.

The mutually facing bearing regions 21a, 23a and 23b, 22a do not absolutely have to run parallel to each other. The bearing regions 21a, 23a and 23b, 22a can be coated in some regions or over the entire surface or can be provided with corresponding inserts in order, depending on requirements, to facilitate or make it more difficult for the material layer 1 or 2 retained in each case between two clamping frame elements to continue flowing. In order to facilitate a continued flowing of a material layer 1 or 2, the respective bearing regions or segments arranged thereon can contain, for example, polytetrafluoro ethylene (PTFE) constituents or can have a relatively low surface roughness. For this purpose, the respective bearing regions or segments arranged thereon can also have a metallic coating which, for example, is applied by electroplating. In order to make it more difficult for a material layer 1 or 2 to continue flowing, the respective bearing regions can contain friction-increasing constituents or segments. For this purpose, a suitable surface structure can also be provided.

The respective bearing regions 21a, 23a or 23b, 22a, which are provided for holding a material layer 1 or 2, or segments arranged on said bearing regions and/or the tool parts 11 or 12 can be designed in a manner such that their temperature can be controlled entirely or in some regions by means of a temperature control device. In this case, all of the bearing regions 21a, 23a and 23b, 22a or an individual bearing region or only two mutually facing bearing regions or else just one tool part 11 or 12 can be temperature controlled entirely or in some regions. The temperature control device which can be arranged for this purpose is designed in such a manner that it can be used to set or regulate a temperature of the bearing region or of the segment constantly or as a function of time or process. The setting can be realized by means of a control, also with the aid of temperature sensors, in the bearing region or segment to be temperature-controlled in each case. The alternative regulation takes place on the basis of the temperatures, which are detected by means of temperature sensors, on the bearing region or segment to be temperature-controlled in each case.

By controlling the temperature of at least one bearing region or segment, the play of guides or fits or the spacing of movable parts can be optimized and, in particular, can be reduced, since the expansions of movable parts caused by the temperature changes can be set within predefined limits. The accuracy of the tools, the operational reliability and reliability of the production apparatus can thereby be improved.

A further advantage which can be achieved by controlling the temperature of at least regions of the bearing surfaces or segments or of at least one clamping frame element of the clamping frame device 20 or of one or more of the molding tools 10 is that the formation of condensed water on a supercooled tool or clamping frame surface can be prevented. This also prevents the material layers from being cooled, said cooling making it more difficult and even preventing the material layers from being able to be molded and connected to each other.

The temperature control mentioned makes it possible to prevent regions of the bearing surfaces or segments from overheating. Overheating of this type would, in particular, negatively influence the surface structure of the component to be produced, as a result of which, in particular, a possibly desirable bowing effect, such as, for example, anti-dazzle effect, could be prevented. Therefore, it is advantageous, during the temperature control in particular also by means of a cooling mechanism, to provide a predefined process temperature.

The controlling of the temperature of one or both of the tool parts 11, 12, which control can be provided in addition or as an alternative to the controlling of the temperature of clamping frame elements, can be temperature-controlled by means of the abovementioned temperature control device or by means of a further temperature control device. In this case, a respective region on the molding contour 13 or 14 is temperature-controlled in order to bring or obtain the material used for the particular material layer 1 or 2 to an advantageously processible state. A further advantage is that, by controlling the temperature of parts of the production apparatus, optimized configuration or operation of the same can take place.

Figure 1:
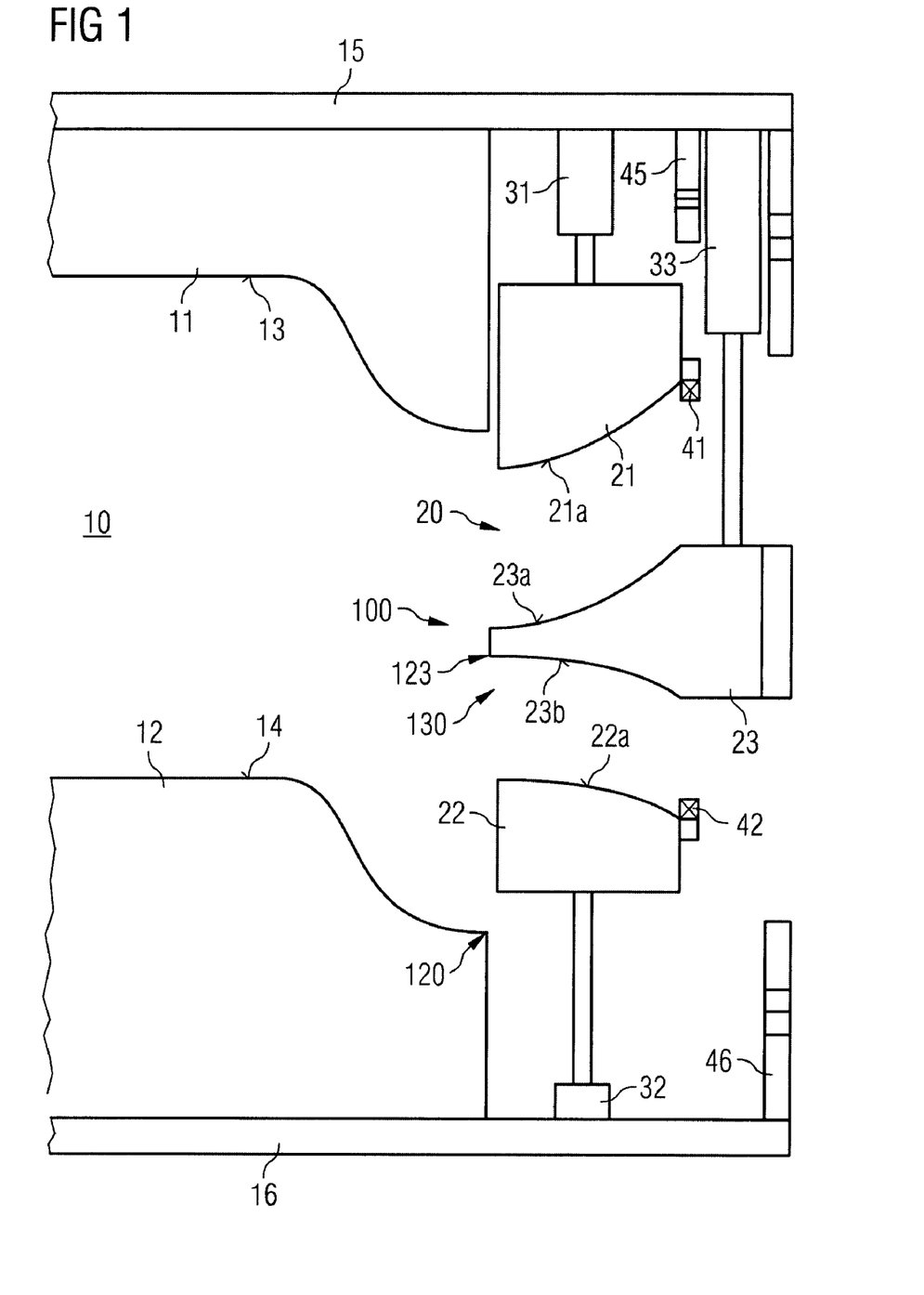
FIG. 1 shows an embodiment of the production apparatus according to the invention in a first or basic position, in which the molding tool is in an open position and a first and a second clamping frame element of three clamping frame elements are moved apart, with the production apparatus being arranged with a cutting apparatus on the third or central clamping frame element.

The tool parts 11, 12 are movable with respect to each other between two positions by means of a tool advancing device (not illustrated). Each clamping frame element 21, 22, 23 is also movable independently by means of a respectively correspondingly assigned adjusting device 31, 32 and 33. Mechanical connection to the tools 11, 12 enables the frequency of the required actuations of the adjusting devices to be reduced. In this case, each clamping frame element 21, 22, 23 has at least one movement region which is required for use of the production apparatus for production of a component. The third clamping frame element 23 is movable between the extended positions of the first and of the second clamping frame element 21, 22 (FIG. 1). The positions between which the clamping frame elements are movable, and the positions between which the tool parts are movable at the same time, are provided in such a manner that the first and the second material layers 1, 2 can be inserted and also molded and pressed on while, at the same time, those excess length regions or edge regions of the material layers 1, 2 which are placed outside the molding contours 13, 14 are secured in such a manner that, over the course of the tool parts 11, 12 being moved together, continued flowing of one or both of the material layers is temporarily possible.

The advancing device of the third clamping frame element 23 can be coupled to the first tool part 11, for example via the first tool holder 15, or, alternatively, can be coupled to the second tool part 12, for example via the second tool holder 16.

The extension positions of the advancing devices for the tool parts or the clamping frame elements can be coupled to one another or can be independent of one another. In the illustrated embodiment of the production apparatus, the first tool part 11 together with an end of the first advancing device 31 and of the third advancing device 33 is arranged on the first tool holder 15, and the second tool part 12 together with an end of the second advancing device 32 is arranged on the second tool holder 16. Alternatively, the third clamping frame element 23 can also be arranged on the second tool holder 16. Alternatively, partial or complete independence of the extension positions can be realized, for example by the adjusting device for the tool and the adjusting device for a clamping frame element assigned to said tool being arranged or fitted independently of each other mechanically.

The adjusting device positions required in the production method can be achieved by means of sensors and a comparison of the particular desired and actual position in a corresponding control device. In this case, it can be provided that the sensors detect the position of a corresponding actuating element in the respective advancing device or the position of the respective clamping frame element or tool part itself.

In the embodiment of the production apparatus according to FIG. 1 et seq., the retraction and extension positions of the clamping frame elements, which positions are provided for the method according to the invention, are achieved

- via mechanical limiting elements together with the mechanical coupling of the extension positions of the clamping frame advancing devices to the position of the respectively assigned tool part,
- by preferably mechanically defined maximum retraction and extension positions of the three clamping frame elements together with an additional limiting element for an intermediate position of the third clamping frame element, and
- configuration of the third advancing device in comparison to the first and second advancing devices in respect of the adjusting force exerted in each case by the latter.

In this embodiment, each adjusting device needs to be moved to and fro only in a predefined sequence between two opposite end positions, in a manner controlled via an assigned control device, in order to fulfill the correct function for the production method according to the invention. The saving of sensors and a control based on a desired-actual comparison for the respective extension position of each adjusting device makes this embodiment of the production apparatus cost-effective.

In the embodiment illustrated, two spacers 41, 42 and two length-changeable distancing elements 45, 46 are provided for this. The spacers 41, 42 are provided in order to be able to move respectively adjacent clamping frame elements 21, 23 or 23, 22 relative to each other at a defined distance and in order to be able to delimit them at a minimum distance from each other at least for a certain time. For this purpose, on corresponding clamping frame elements 21, 22, 23 there can be arranged rigid spacers or spacers which are height- or length-changeable in the direction of the movements or corresponding relative movements of the clamping frame elements. When spacers which are fixed with respect to the movements of the clamping frame elements, i.e. are not height-changeable, are used, by moving the respective clamping frame elements together, a constant minimum distance is achieved between them during the production process. When height-changeable spacers are used, those positions of the clamping frame elements which are defined by the stop elements are approached by the corresponding movement of said clamping frame elements. During the further course of the process, the spacers are changed in their height in a predefined manner such that the distance of the clamping frame elements relative to each other is also changed. This can be changed on the basis of the closing movement of the tool parts and/or coupled to the extension position of the respective adjusting device. By changing the distance, the continuing-flowing and clamping behavior of the clamping frame elements with regard to the material layers 1, 2 respectively held is changed. The effect achieved by this is that, in each position of the tool parts, a continued flowing of the material layers 1 and 2 held by the respective clamping frame elements is ensured, if this is required by the molding contour provided by the tool parts 11, 12, in order to produce the component in the designated form, thickness and strength in a crease-free manner.

FIG. 1 illustrates a spacer 41 and a spacer 42. The spacer 41 is fitted on that side of the first clamping frame element 21 which faces the third clamping frame element 23 and defines the minimum distance between the first and the third clamping frame elements. The spacer 42 is fitted on that side of the second clamping frame element 22 which faces the third clamping frame element 23 and defines the minimum distance between the second and the third clamping frame elements. Similarly, the spacer 41 could be arranged on that side of the third clamping frame element which faces the first clamping frame element 21. Analogously, the spacer 42 could be arranged on that side of the third clamping frame element 23 which faces the second clamping frame element 22.

When the spacers are configured as height-changeable spacers, they can be extended via an actuating drive, which is functionally connected to the control device, in order to bring about the spacing, which is required in phases, of the respectively interacting clamping frame elements by means of a corresponding extension position of the particular spacer at a particular moment. In addition to such an electronically controlled adjustment of the spacers, the latter can alternatively also be controlled hydraulically or via a radial cam. Such a radial cam for the clamping frame elements preferably takes the respective positions of the tool parts into consideration.

Figure 2:
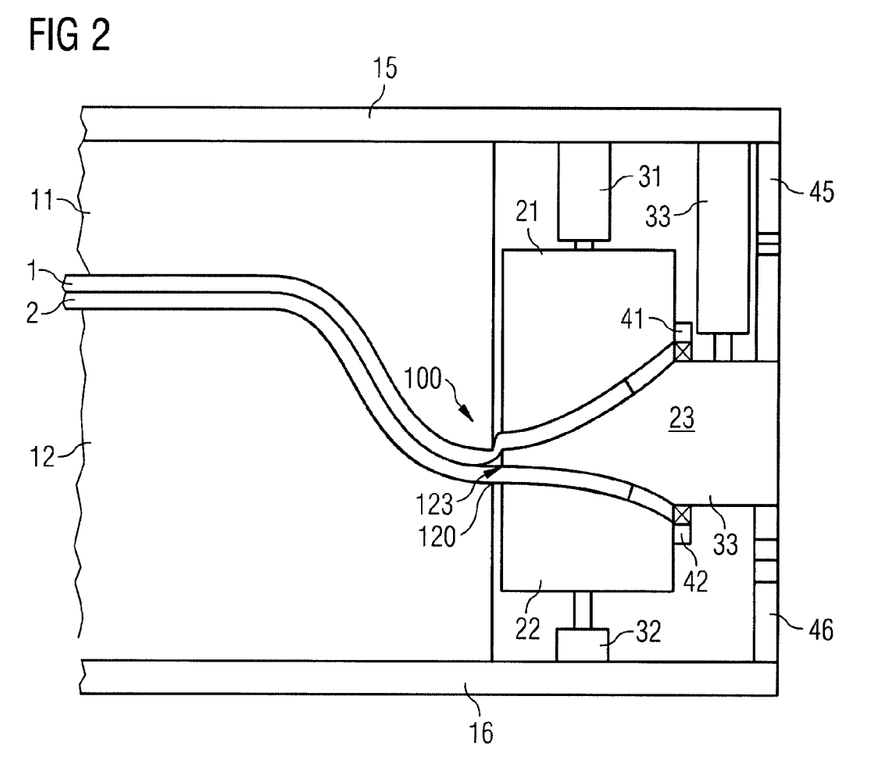
FIG. 2 shows the embodiment of the production apparatus according to the invention as per FIG. 1 in a closed position of the tool with the cutting apparatus in the state prior to the cutting operation.

The tool parts 11, 12 are movable via a tool intermediate position into a closed position or pressing position or laminating position (FIG. 2).

In the apparatus and the method according to FIGS. 1 to 7
- the first and the third clamping frame elements and the second and the third clamping frame elements are separated from each other by the respective spacers 41 and 42, and
- the third clamping frame element is retained in a predefined manner between the distancing elements 45, 46, with the first and the second distancing elements 45 and 46 being in an extended position such that the three clamping frame elements 21, 22, 23 are separated from one another by the spacers 41, 42 and, together with the first and second material layers 1 and 2 placed between them, are in a position in which that contour point of the second clamping frame element 22 which is placed closest in the direction of the second tool part 12 is placed within a deviation level with that contour point of the second clamping frame element 22 which is placed closes to the second clamping frame element 21, with said deviation being equal to twice the thickness of the second material layer 2.

The tool parts 11, 12 are preferably moved into their closed position by the adjusting device of the tool parts 11, 12, and the arrangement with the first, the second and the third clamping frame elements 21, 22, 23 is moved into a position in which additionally that contour point of the first clamping frame element 21 which is placed closest in the direction of the first tool part 11 is placed within a deviation level with that contour point of the first clamping frame element 21 which is placed closest to the first clamping frame element 21, with said deviation preferably being equal to three times the thickness of the first material layer 1.

The closed position of the tool parts 11, 12 is a position in which the first material layer 1 and the second material layer 2 can be connected to each other, and in which, if appropriate, the pressure required for such connection can be built up.

The production apparatus can also be partially or entirely operated via electronically activated or monitored adjusting devices, in which the intermediate positions of the third clamping frame element can be achieved via sensors or incremental transducers and a corresponding control device.

The third clamping frame element can be formed in such a manner that it can hold one material layer or a plurality of material layers such that, then, the production apparatus can be used, according to the invention, to process three material layers or more than three material layers together. In this case, a plurality of third clamping frame elements can also each be provided with a dedicated third adjusting device.

According to the invention, it is ensured, in particular, that a free continued flowing of the material layers, which continued flowing is to be provided depending on the application, is possible during the transitions into the various positions of the production apparatus:

By spacing apart the first clamping frame element from the third clamping frame element and spacing apart the second clamping frame element from the third clamping frame element by means of preferably adjustable spacers 41, 42 and alternatively or additionally by means of a controlled and optionally travel-monitored adjusting movement of the three clamping frame elements, which movement takes place by means of the electronic travel control of the adjusting devices 31, 32, 33 and clamping frame elements 21, 22, 23, it is achieved that the first and/or the second material layer 1 and/or 2 can continue to flow to a greater or lesser extent, depending on the requirement of the application, during the closure of the molding tool. In this case, the distance set can also be provided in such a manner that the material layers 1, 2 can be clamped, i.e. can be held by the respective clamping frame elements. Depending on the application, the respective setting can realize these extreme states or can realize states between these extreme states.

The arrangement of the third clamping frame element 23, which arrangement is preferably provided in the end phase of the moving together of the tool parts 11, 12, from a certain position of the same with respect to each other, has the effect, in a distance, which is dependent on the application, relative to the first and/or second clamping frame element that the material layers 1, 2 are retained by the respective clamping frame elements 21, 23 and 22, 23 or the clamping frame elements permit a defined continued flowing of the material layers 1, 2. The effect achieved by ensuring a continued flowing of one or more of the material layers is that, in particular when tool parts having molding contours running three-dimensionally are used, a crease in the region of the subsequent component contour is avoided. In this case, the selection of the retaining force for the first material layer 1 or the generosity with the effect of permitting continued flowing of this material layer 1 can differ from the selection of the retaining force exerted on the second material layer 2 or permitted generosity.

The cutting apparatus provided according to the invention is arranged, if appropriate can be activated in the closed position of the tool parts 11, 12, in order to cut or trim one or more of the material layers 1, 2. In this case, cutting can be provided in sections of the circumference of the molding contours or over the entire circumference. An excess length of the first and/or of the second material layer can also be cut off by means of the cutting apparatus. A bending excess length for one or both material layers can also be formed by the cutting operation if, by cutting or shortening one material layer 1, 2 in comparison to another material layer 2 or 1, the respectively other material layer 2 or 1 protrudes over the material layer cut further. The resultant excess length can be processed in a further method step to form a bend, for example about the shorter material layer. In the case of the apparatus according to the invention, an individual material layer can also be trimmed, since the material layers are kept separate from each other outside the molding contours 13, 14 by the third clamping frame device 23. The cutting device can be arranged on the first clamping frame element and/or the third clamping frame element for cutting off an excess length of the one material layer or of a plurality of material layers, which excess length emerges between the first and the second tool parts.

The press molding tool according to the invention comprises at least one cutting device 100, 200, 300 with a cutting element 130, 230, 330 which, as seen in its opening and closing direction, runs in a segmental manner on the circumference of the tool parts 11, 12 or completely encircles the latter, for cutting off an excess length of at least one of the material layers, which excess length is present next to the two tool parts 11, 12 during the press molding and is movable relative to at least one of the tool parts 11, 12. A plurality of cutting devices can also be arranged in the press molding tool.

The cutting device can be realized in different ways:

One cutting device can be arranged on the third clamping frame element 23.

FIG. 1 illustrates an embodiment of the cutting device which is arranged on the third clamping frame element 23 and has a cutting element 130 in the form of an edge 123, which is a part of the clamping frame element 23 which faces the tool parts 11, 12. In this case, the third clamping frame element is movable relative to the first or second tool parts 11, 12 in the closed position thereof in such a manner that the edge 123 interacts with a corresponding bearing region of the first or second tool part 11, 12 in order to be able to sever an excess length of the first or second material layer 1, 2.

Figure 3:
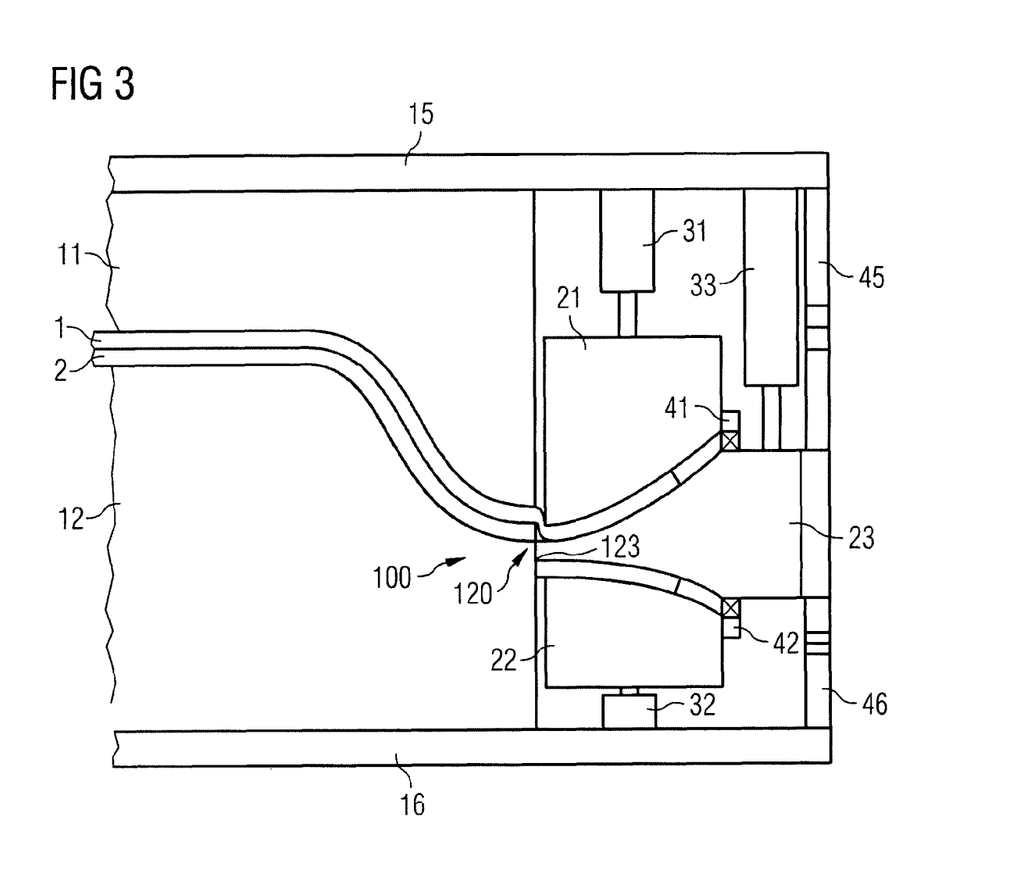
FIG. 3 shows the embodiment of the production apparatus according to the invention as per FIG. 1 in a closed position of the tool with the cutting apparatus according to the invention in the state after the cutting operation.

The cutting element of this embodiment of the cutting device 100 can be actuated in the direction of the adjusting movement of the third clamping frame element 23 in order to hold the first or second material layer 1, 2. The cutting device 100 is part of the third clamping frame element 23 and of at least one tool part 11, 12, with the cutting operation taking place by means of movement into predefined apparatus positions. FIG. 3 shows the production apparatus with a position of the clamping frame elements, in which the third clamping frame element 23 or the cutting device 100 has executed the cutting movement.

For this purpose, the third clamping frame element has a cutting element 130 in the form of a front edge which acts as a cutting edge 123. Furthermore, for example, that contour point of the first and/or second tool part 11, 12—depending in each case on the arrangement and movability of the third clamping frame element relative to the tool parts 11, 12—which contour point is placed closest to the third clamping frame element 23, is designed as a counterposition 120 to the cutting edge 123 and, optionally, additionally as a cutting edge. The counterposition is formed on the first tool part 11 if the first material layer 1 is to be cut by means of the cutting apparatus 100 or the cutting edge 123. Alternatively or in addition, the counterposition 120 is formed on the second tool part 11 if the second material layer 2 is to be cut by means of the cutting apparatus 100 or the cutting edge 123.

The front edge or cutting edge 123 of the third clamping frame element 23 is arranged in such a manner that, given a corresponding position of the third clamping frame element 23 with respect to the first and/or second tool part 12, it runs in some regions close to the outer contour of the tool part 12 and, at the same time, is spaced apart from the same at a distance suitable for the cutting operation.

The front edge 123 on the third clamping frame element and/or the counterposition 120 on the first tool part 11 or second tool part 12 can be of hardened or hardened and tempered design.

The cutting process by means of the first cutting device 100 when the front edge 123 interacts with the second tool part 12 (FIGS. 1 to 3) is as follows:

After the closed position of the molding tool is reached, in which, in the case of the apparatus according to FIGS. 1 to 3, the third clamping frame element initially continues to rest on the extended second distancing element 46, the third clamping frame element 23, which is driven by the third adjusting device 33, is lowered by the third adjusting device 33 into a lower position such that the cutting edge moves past the counterposition 120 at a short distance. The distance is selected in such a manner that that excess length of the first material layer 1 which is situated outside the molding contours of the tool parts can be severed or cut off. In the embodiment of the production apparatus according to FIGS. 1 to 3, this takes place by retraction of the second distancing element 46. In this embodiment, the lower position of the second distancing element 46 is preferably provided in such a manner that the latter limits the movement of the third clamping frame element 23 downward after the cutting operation. The first adjusting device 31 can be actuated or can be actuable in such a manner that it assists the cutting force exerted by the third adjusting device 33. In the process, the second clamping frame element 22 is over-compressed and/or switched to a depressurized state prior to/with the cutting movement or retracted during the cutting movement.

Additionally or alternatively, the cutting device 100 arranged on the third clamping frame element 23 can comprise a blade 230 which is movable by means of an adjusting device on the third clamping frame element 23 and transversely with respect to the opening and closing movement of the tool parts 11, 12 in order to be able to sever an excess length of the first or second material layer 1, 2.

Figure 4:
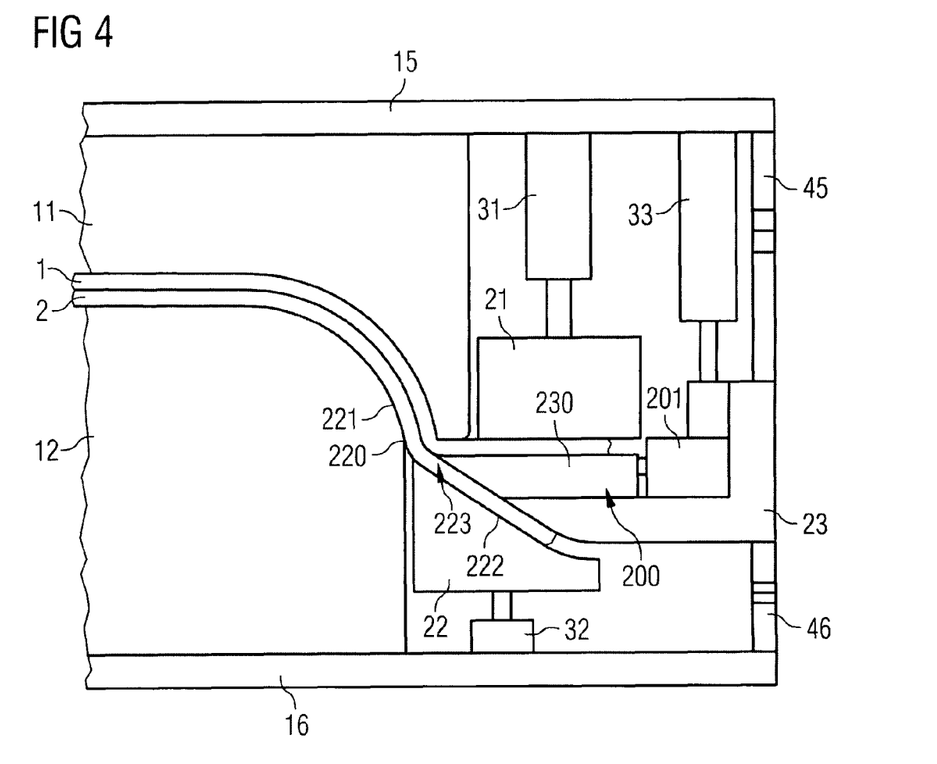
FIG. 4 shows the embodiment of the production apparatus according to the invention as per FIG. 1 in a closed position of the tool with a second embodiment of a cutting apparatus, which is arranged on the central clamping frame element, in the state prior to the cutting operation.
Figure 5:
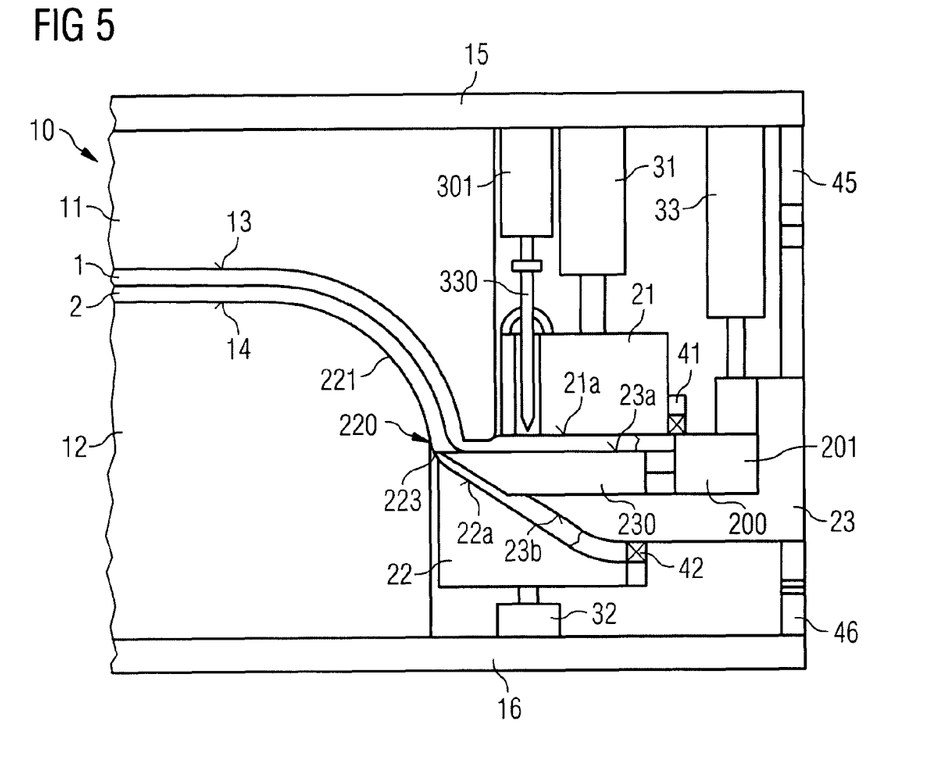
FIG. 5 shows the embodiment of the production apparatus according to the invention as per FIG. 1 in a closed position of the tool with the second embodiment of the cutting apparatus according to the invention in the state after the cutting operation, and with a further cutting apparatus arranged on a first clamping frame element.

The blade 230 of this embodiment of the cutting device 200 can be actuated at an angle or transversely with respect to the direction of the adjusting movement of the third clamping frame element 23 for holding the first or second material layer 1, 2. The second cutting device 200 is part of the third clamping frame element 23 or is assigned thereto. In both cases, said blade is moved or actuated via an adjusting device 201 in order to cut off an excess length of the second material layer 2, which excess length emerges between the first and the second tool parts (FIGS. 4 and 5). The blade 230 has a cutting edge 223 which faces the second tool part 12.

On the basis of the actuation of the actuating drive 201 of the blade 230, the latter is moved up to a corresponding edge region 221 of the second tool part 12, which edge region is provided as the countersurface or counterposition 220 for the cutting edge, which faces it, of the blade 230. By means of corresponding retraction of the second adjusting device 32, a part of the corresponding excess length of the second material layer 2, which excess length is to be cut off, is placed between the cutting edge of the blade and the second tool part 12. The excess length of the second material layer 2 is then cut off by the pressure applied on the basis of the advancing movement of the blade 230.

Alternatively, a corresponding edge region 222 of the second clamping frame element 22 can also be used as a counterposition such that, then, an excess length of the second material layer 2 can be cut off by the cutting edge 223 of the blade 230 and the counterposition 222 of the second clamping frame element 22.

The cutting element of the cutting device 100, 200 is able to be positioned in particular in such a manner that, when the tools 11, 12 are moved together, the continued flowing of the material layers 1, 2 placed into the clamping frames is not obstructed.

Alternatively or in addition to the cutting devices 100, 200 mentioned, a cutting device 300 with a cutting element 330 can be arranged on the first clamping frame element 21 and/or second clamping frame element 22. The cutting element is a blade 330 which is movable on the first or second clamping frame elements 21, 22 by means of an adjusting device or drive 301. Said blade is guided by a corresponding guide device in such a manner that it is movable at an angle to or in the direction of the opening and closing movement of the tool parts 11, 12.

The cutting device 300, which is optionally arranged on the first or second clamping frame elements 21, 22, can be designed in such a manner that, in the closed position of the clamping frame elements 21, 22, 23, the blade 330 can be positioned in such a manner that, in its initial position, it does not touch the material layers 1, 2 placed into the clamping frame.

The cutting device 300 can be designed in such a manner that, in its cutting position, the blade 330 at least partially protrudes through the first or second clamping frame elements 21, 22.

In the case of the cutting devices mentioned, the cutting element 130, 230, 330 of the cutting device 300 is able to be heated by means of a heating device. In this case, the heating device of the cutting element 130, 230, 330 can have a receptacle for at least one heating cartridge insertable therein. Alternatively, the heating device of the cutting elements 130, 230, 330 can have electric resistance heating.

In the case of an embodiment of the cutting device with a movable blade, the movability of the blade can be brought about by an electric, hydraulic or pneumatic drive or by a manual actuating device.

Generally, at least one of the clamping frames 21, 22, 23 can be assigned a device for controlling the temperature of the clamping frame. The optionally provided control of the temperature of at least one bearing region or segment makes it possible to optimize, and in particular reduce, the play or the spacing of the cutting surface with respect to the second tool part, i.e. the cutting fit.

According to the invention, a method for production of a component from at least one first material layer 1 or decoration layer and one second material layer 2 or support layer is provided, in which molding of the first material layer 1 and of the second material layer 2 and connection of the two material layers 1, 2 to each other takes place by moving together a first tool part 11 and a second tool part 12 of a molding tool with preferably three-dimensional molding contours, with the molding contour of the first tool part 11 facing the first material layer 1 and the molding contour of the second tool part 12 facing the second material layer 2, the first tool part 11 and the second tool part 12 having been moved apart in an initial position. The method according to the invention comprises the following steps:

moving a first clamping frame element 21 and a second clamping frame element 22 into an extended position with respect to each other and placing the first material layer 1 in a placing-in position between the two tool parts 11, 12 and between the first clamping frame element 21 and a third clamping frame element 23, which is arranged between the first clamping frame element 21 and the second clamping frame element 22, with the first, second and the third clamping frame elements being arranged outside the molding contour of the tool parts 11, 12;

moving the third clamping frame element 23 into a retaining position for the first material layer 1, in which position the third clamping frame element 23 is at a predefined distance from the first clamping frame element 21 and in which the first material layer 1 is retained by the first clamping frame element 21 and the third clamping frame element 23 (FIG. 3), placing the second material layer 2 between the two tool parts 11, 12 and onto the second clamping frame element 22 (FIG. 4), moving the second clamping frame element 22 into a retaining position for the second material layer 2, in which position the second clamping frame element 22 at a predefined distance from the third clamping frame element 23, and in which the second material layer 2 is retained by the second clamping frame element 22 and the third clamping frame element 23 (FIG. 5), moving together the tool parts to relative positions with respect to each other, during which the first material layer 1 and the second material layer 2 are molded, after the molding, moving apart the tool parts and the clamping frame elements in order to remove the interconnected first and second material layers from the tool, after the molding operation, cutting off an excess length of the second material layer, which excess length emerges between the first and the second tool part, by means of the cutting device 100 arranged on the third clamping frame element.

Before the material layers 1, 2 are placed between the tool parts, heating of the first or of the second material layer can take place.

The invention claimed is:

1. A press molding tool for production of a component from at least one first material layer and one second material layer with at least one first tool part and one second tool part each having a three-dimensional molding contour, wherein, when the first material layer and the second material layer are placed into the apparatus, the molding contour of the first tool part faces the first material layer and the molding contour of the second tool part faces the second material layer, wherein the tool parts are clamped in a pressure transducer in order to bring about the molding of the first material layer and of the second material layer and the connection of the two material layers to each other by moving the first and the second tool part together, and with a clamping frame device in order to hold the material layers in their closed position outside the contour region of the tool during the molding operation, wherein the clamping frame device comprises a first clamping frame element which is movable relative to the first tool part by means of a first adjusting device, a second clamping frame element which is movable relative to the second tool part by means of a second adjusting device, and a third clamping frame element which is movable relative to the first or second tool part by means of a third adjusting device and is arranged between the first and the second clamping frame elements, said first, second and third clamping frame elements being moveable relative to each other by the respective first, second and third adjusting devices such that a first material layer can be held between the first and third clamping frame elements and a second material layer can simultaneously be held between the second and third clamping frame elements, such that the first material layer and the second material layer are able to flow relative to each other during the molding of the layers, and the press molding tool comprises at least one cutting device arranged on the third clamping frame element with a cutting element which is movable relative to at least one of the tool parts, and as seen in the opening and closing direction of the tool parts, runs in a segmental manner on the circumference of the tool parts or completely encircles the latter, for cutting off an excess length of at least one of the material layers, which excess length is present next to the two tool parts during the press molding.

2. The press molding tool for production of a component as claimed in claim 1, wherein the cutting element of the cutting device arranged on the third clamping frame element is an edge of the clamping frame element, and the third clamping frame element is movable relative to the first or second tool part into the closed position of said edge in such a manner that the edge interacts with a corresponding bearing region of the first or second tool part in order to be able to sever an excess length of the first or second material layer.

3. The press molding tool for production of a component as claimed in claim 2, wherein the cutting element of the cutting device arranged on the third clamping frame element comprises an arranged blade which is movable on the third clamping frame element and transversely with respect to the opening and closing movement of the tool parts by means of an adjusting device in order to be able to sever an excess length of the first or second material layer.

4. The press molding tool as claimed in claim 3, wherein the movability of the blade is brought about by an electric, hydraulic or pneumatic drive.

5. The press molding tool as claimed in claim 3, wherein the movability of the blade is brought about by a manual actuating device.

6. The press molding tool for production of a component as claimed in claim 1, wherein a further cutting device is arranged on the first clamping frame element and/or the second clamping frame element, and the further cutting device is a blade which is arranged on said clamping frame element by means of an adjusting device and is movable at an angle to or in the direction of the opening and closing movement of the tool parts.

7. The press molding tool as claimed in claim 6, wherein the cutting device (300)-is designed in such a manner that, in the closed position of the clamping frame elements the blade can be positioned in such a manner that, in its initial position, it does not touch the material layers placed into the clamping frame.

8. The press molding tool as claimed in claim 6, wherein the cutting device is designed in such a manner that, in its cutting position, the blade at least partially protrudes through the first or second clamping frame element.

9. The press molding tool as claimed in claim 1, wherein the cutting element of the cutting device can be heated by means of a heating device.

10. The press molding tool as claimed in claim 9, wherein the heating device of the cutting element has a receptacle for at least one heating cartridge which can be inserted therein.

11. The press molding tool as claimed in claim 9, wherein the heating device of the cutting element has electric resistance heating.

12. The press molding tool as claimed in claim 1, wherein at least one of the two clamping frames is assigned a device for controlling the temperature of the clamping frame.

13. A method for production of a component by press molding of a first and of a second material layer, during which the two layers are connected within the molding contours of two tool parts by moving the latter together, the first tool part and the second tool part having been moved apart in an initial position, said method comprising the following steps:
   (a) moving a first clamping frame element and a second clamping frame element into an extended position with respect to each other and placing the first material layer between the two tool parts and between the first and a third clamping frame element, which is arranged between the first and the second clamping frame elements, and placing the second material layer between the two tool parts and between the second clamping frame element and the third clamping frame element, with the first, second and the third clamping frame elements being arranged outside the molding contour of the tool parts,
   (b) while the first and second tool parts remain apart, moving the first clamping frame element, second clamping frame element and the third clamping frame element into a position in which the first material layer and the second material layer are held by the first clamping frame element and the third clamping frame element and, respectively, by the second clamping frame element and the third clamping frame element, such that the first material layer and the second material layer are able to flow relative to each other during the molding of the layers,
   (c) thereafter moving the tool parts together relative to each other with molding of the first and of the second material layers in the region of the molding contours of the tool parts,
   (d) using a cutting device arranged on the third clamping frame element to cut off an excess length of at least one of the material layers, which excess length protrudes from between the first tool part and the second tool part, and
   (e) moving the tool parts and the clamping frame elements apart in order to be able to remove the interconnected first and second material layers from the tool.

14. The method for production of a component by press molding as claimed in claim 13, wherein said cutting device comprises a movable blade arranged on the third clamping frame element which blade is moved toward the excess length of the particular material layer, which excess length emerges from between the first and the second tool part, until said blade severs the material layer.

15. The method for production of a component by press molding as claimed in claim 14, wherein a cutting element of a further cutting device arranged on the first clamping frame element and/or the second clamping frame element is positioned, in the closed position of the clamping frame elements in such a manner that, in its initial position, said cutting element does not touch the material layers placed into the clamping frame.

16. The method as claimed in claim 13, wherein the cutting device comprises a cutting edge arranged on the third clamping frame element and cutting is effected by moving the third clamping frame element into a lower position such that the cutting edge arranged on the third clamping frame element moves past a counterposition on the first or second clamping frame element at a short distance, during which the excess length of the material layer respectively bearing against said element is cut off.

* * * * *